July 30, 1963   J. O. ELLISON   3,099,490
LAMINATED WHEEL
Filed March 2, 1961
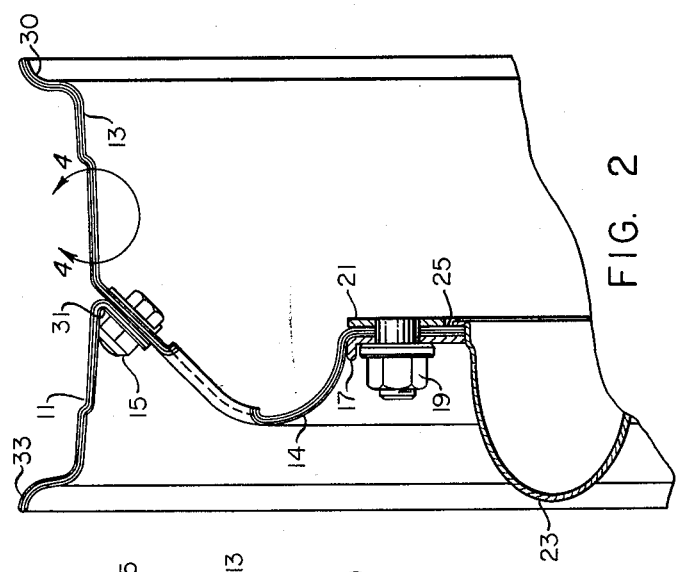
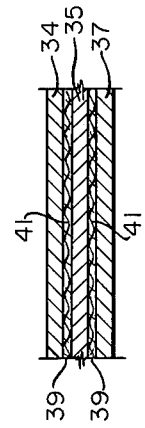
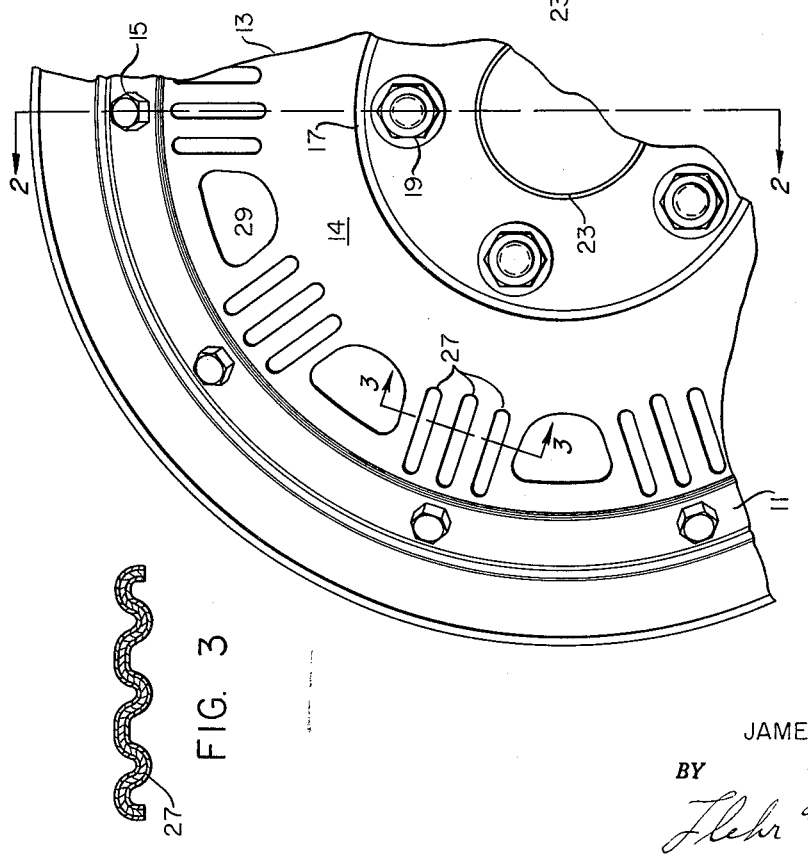
*INVENTOR.*
JAMES O. ELLISON
BY
*Flehr and Swain*
ATTORNEYS

United States Patent Office 3,099,490
Patented July 30, 1963

3,099,490
LAMINATED WHEEL
James O. Ellison, Piedmont, Calif., assignor of 24/100 to
T. B. Griffith, San Carlos, Calif., and 24/100 to Ellen
Younglove, San Francisco, Calif.
Filed Mar. 2, 1961, Ser. No. 92,924
7 Claims. (Cl. 301—9)

This invention relates to wheels, more particularly to vehicular wheels of laminated construction.

Although it is considered a foregone conclusion by the uninitiated that all wheels are round, it is well known by those skilled in the art that such is not the case. Wheels used in the automobile industry for passenger vehicles are often as much as 3/16 of an inch out of round. This is considered acceptable by the industry and is compensated by the use of balancing weights on the wheel rims. The weights help to compensate, not only for the nonconcentric nature of the wheels but also for the imbalance of the tires used with the wheels.

However, when fine performance is required from a vehicle the use of balancing weights is not considered adequate. Rather it is attempted to provide wheels which are round within very narrow tolerance limits. To this end, on racing cars, on automobiles, trucks and on aircraft nonferrous cast and forged wheels have been employed. Cast and forged wheels are produced with sufficient rim thickness to permit required machining cuts for rounding the wheels without weakening. In the stamped wheel, however, the material from which it is made is so thin that machining operations for the rounding purposes is impractical.

Such nonferrous material as aluminum and magnesium have been particularly acceptable by the industry and are used to produce wheels which are round within several thousandths of an inch. However, the use of these metals has given rise to several disadvantages. The metals tend to be, in the terminology of the art, "notch conscious." A cast wheel of aluminum or magnesium tends to fracture along the lines of notches which may have been scratched into the wheel during normal use. It is apparent that in the normal use of a wheel, not only while changing tires but in normal driving, the wheel itself is frequently scratched or notched due to the improper use of a lug wrench or merely from flying gravel on the road. That cast aluminum and magnesium wheels have a tendency to fracture along these notch lines to such an extent that failure is almost certain after a prolonged period of use.

Although this invention does not deal exclusively with nonferrous metals such as magnesium and aluminum, such metals are particularly adapted to construction in accordance with the invention. However, ferrous metals such as steel and stainless steel may also be utilized with great advantage in accordance with the invention.

Although the ferrous metals may be employed, it is noted that aluminum and magnesium are much better suited for wheels due to their relatively high heat dissipation, low weight and the relative ease in which they may be concentrically pressed.

Thus, it is a general object of this invention to provide an improved wheel structure.

It is a more particular object of this invention to provide an improved laminated wheel structure.

It is still another object of this invention to provide a wheel structure having relatively high heat dissipation and which avoids the disadvantage of other high heat dissipating wheels in that notch consciousness is avoided.

It is still another object of this invention to provide a wheel of the aforementioned characteristics which may be concentrically formed within the narrow tolerance limits and with relative ease.

It is still another object of this invention to provide a wheel structure having aforementioned characteristics and which is relatively economical to produce.

It is still another object of this invention to provide a relatively high strength and light wheel being round within very narrow tolerance limits and being relatively insensitive to notches thereon.

These and other objects and features of the invention will become more clearly apparent upon a review of the following description in conjunction with the accompanying drawing in which:

FIGURE 1 is a partial elevational view of a wheel structure in accordance with this invention;

FIGURE 2 is a cross sectional view taken along the lines 2—2 of FIGURE 1;

FIGURE 3 is a cross sectional view taken along the lines 3—3 of FIGURE 1; and

FIGURE 4 is a sectional view of the laminated material before pressing into the configuration shown in FIGURES 1 to 3.

Referring to the figures, the wheel is shown to include a front section 11 and a rear section 13 including the web portion 14 which is adapted to be removably affixed to a brake drum. The front and rear sections 11 and 13 are joined together by means of nuts and bolts 15 about the inner periphery of the front section. A centering plate 17 is force fit in the center of the front section 11 and retained by an adhesive bonding agent. The centering plate 17 may be of a hard metal such as steel to prevent unnecessary scaring while fastening the lug nuts 19. A reinforcing plate 21 is secured, also by an adhesive bonding agent, to the back central portion of the rear section 13. This plate may be constructed of a relatively soft metal such as aluminum.

A hub cap 23 may be employed and may be held in place by means of the over extending edge 25 of the rear section 13.

In order to increase the strength and at the same time to maintain low weight, ribs 27 and turned openings 29 are employed.

As noted in FIGURE 2 the wheel shown does not employ the use of a drop center for changing tires. Rather the individual front and rear sections 11 and 13 are joined by the nuts and bolts 15.

The maximum distortional force is applied to a wheel when the vehicle is in a turning state. The wheels on the left hand side have maximum distortional force when the wheel is turning to the right and vice versa. In the opposite turning condition there is a tendency to lift the wheels from the road thereby reducing this force. When the wheel is in a condition of turning the distortional force is applied outwardly along the line of the axle and is retarded by the frictional engagement of the tire on the road beneath.

In order to provide maximum strength in the wheel, when that maximum strength is required, the rear section 13 is constructed as a single member from the rear bead seat 30 to the central extension 25.

Also, to provide strength the front section 11 of the wheel includes a 45 degree bend 31 at the annulus of connection to the rear section 13. The 45 degree bend 31 provides a compromise for maximum strength against a first force exerted between the two bead seats 30 and 33 together due to tire pressure and a second force required to maintain the bead seats 30 and 33 in a concentric alignment.

Referring particularly to FIGURE 4 the typical construction of the material used in the wheel construction in accordance with the invention is shown. Thus, rather than a single piece of metal such as aluminum or magnesium a plurality of sheets 34, 35 and 37 are employed. Although there are three sheets shown in the drawing, it is obvious that two sheets or any number greater than three may be employed. Each of the three thicknesses of metal 34, 35 and 37 are separated by and joined by a layer of adhesive 39. The particular adhesive used may include the epoxies as well as certain rubber base adhesives. Moreover other bonding techniques may be used. In bonding the various sheets together the continuous bonding throughout the sheet is significant, in that it provides the exceptional strength characteristics necessary. While the sheets may be joined by spot welding at a large number of joints it is apparent that the strength between the welds is not significantly increased by such junction.

In the case of epoxy adhesives the strength of the adhesion is dependent to some extent, at least, on the thickness of epoxy used. Epoxy manufacturers often recommend that the adhesive thickness be between two and five thousandths of an inch. Thus, in addition to the adhesive placed between the various layers of metal, a mat 41, which may be a nylon gauze having the thickness desired for the finished adhesive, is placed between the various sheets of metal. The sheets of metal may then be compressed together with the epoxy and the nylon gauze held between.

In addition to the obvious feature of improved strength characteristics, the use of the laminated metal provides other distinct and unexpected advantages. As stated hereinabove most metals, and particularly nonferrous metals such as aluminum and magnesium have a characteristic known in the art as notch consciousness. Thus, when a piece of aluminum or magnesium is scratched or notched there is a tendency to fracture along the notch lines. However, in the use of laminated material there is not one but several distinct sheets of material employed. If the first or outer layer of the metal is notched there is a tendency only for that outer section to become fractured. When a number of individual laminations are employed clearly the inner laminations are protected by the outer and thereby reduce the notch consciousness of the overall laminate.

In addition to the simple protection provided by the laminations mentioned hereinabove the effect of notching or scratching is even further minimized. Thus, if the outer layer of the wheels should become notched, damaged or perhaps even fractured the result thereof will be localized to the particular area of the notch. The bonding agent itself, in conjunction with even the fractured area will still provide significant strength which would not be available if the wheel were of a single cross section. Thus, the tendency of notch conscious failure is avoided in wheels made in accordance with this invention.

In addition, there are other advantages in the use of wheels in accordance with the invention. In pressing wheels into shape suitable for adequate strength the sharpness of bending is ordinarily limited by the thickness of the metal. Thus, with aluminum or magnesium of sufficient thickness to provide adequate strength the bending is ordinarily slight to prevent fracture at the bend. The radius of such bends is ordinarily the thickness of the material being bent as a minimum. Thus, with a relatively thick sheet of aluminum the maximum radius of bend is limited to that thickness. However, in the present instance the thickness of the individual sheets is relatively narrow and bending is accomplished within much smaller radius thereby making fabrication of the wheels much more feasible. Thus, the wheels may be pressed into a circular configuration within very narrow tolerance limits and may be expected to remain in that configuration due to the relatively high strength of the laminate.

Furthermore the laminated wheel provides a distinct advantage in the increase of the strength to weight ratio of the wheel. Not only does the availability of light material such as aluminum and magnesium provide this increased strength to weight ratio but the use of the laminated material will provide an increased strength to weight ratio even over cast and forged wheels of the same light weight metals. This is due to the fact that in cast or forged wheels of single cross section it is necessary to include in their design a safety factor in the form of additional thickness to withstand the incident of fatigue in areas of localized stress. With the laminated material this extra thickness may be omitted due to the reduction or elimination of those incidents of fatigue.

Thus, it is seen that a new wheel structure is provided wherein a plurality of distiinct sheets of metal are joined together with an adhesive to form a metallic laminate. Each of the individual sheets maintain their distinctive character as individual sheets and thereby avoid the objection of notch consciousness for the entire structure. Moreover, the laminate wheels have an improved strength characteristic over ordinary cast wheels. In addition, the wheels in accordance with the invention have better conformation characteristics than a normal rolled wheel whereby a circular configuration can be formed within narrow tolerance limits.

Another important economic factor in the use of a laminated wheel in accordance with this invention is the possibility of using various different types of sheets for the individual laminations. It is apparent that with practically all vehicular wheels the appearance factor is, at least, considered and may be extremely important. Thus, the exposed portion of many wheels is highly polished or colored. With laminated wheels a highly polished or colored sheet could be used for the exterior lamination while less expensive unpolished sheets may be used for the balance of the laminate.

Although the particular embodiment of the invention discribed herein relates to aluminum and magnesium particularly it is obvious that other metals may be used with perhaps somewhat less advantage. The number of laminations may be any desired number as well as may be the thickness of the individual laminate. Moreover, the thickness of various laminates may vary within a single structure and may be selected dependent upon the desired overall thickness of the laminate.

While the invention has been described in conjunction with a particular wheel configuration, it should be realized that other types of wheels, including the well known drop center wheels, may be advantageously constructed in accordance with this invention. The invention has also been described as related to wheels used with rubber tires. It is apparent, however, that the invention will be useful with other type wheels as well.

I claim:

1. A wheel structure comprising a web portion, a first bead seat integral with said web portion, a second bead seat secured to the integral web of the first bead seat, said web portion and each of said bead seats being formed of a plurality of non-ferrous metallic sheets held in spaced relationship from each other by an adhesive, individual ones of that plurality of sheets which form said web portion and said first bead seat being coextensive with each other and common to both the web portion and the first bead seat.

2. A wheel structure is defined in claim 1 wherein said metal is aluminum.

3. A wheel structure as defined in claim 1 wherein said metal is magnesium.

4. A wheel structure as defined in claim 1 wherein said adhesive is an epoxy.

5. A wheel structure as defined in claim 1 together with a gauze net interposed between said metallic sheets along with said adhesive.

6. A wheel structure comprising a pair of tire bead seats and a web integral with at least one of said bead seats, said bead seats and web being formed of laminated non-ferrous metal sheets, individual laminations of the sheets in the web and integral bead seat being common to both the web and the integral bead seat, a plate formed of a hard material, and an adhesive layer on said web, said plate being joined to the web by said adhesive layer at a location central with respect to said bead seats.

7. A wheel structure comprising a pair of tire bead seats and a web integral with at least one of said bead seats, said bead seats and web being formed of laminated non-ferrous metal sheets, individual laminations of the sheets in the web and integral bead seat being common to both the web and the integral bead seat, said web being adapted to be removably affixed to a brake drum, a reinforcing plate, and an adhesive layer on said web, said reinforcing plate being joined to the web by said adhesive layer.

References Cited in the file of this patent

UNITED STATES PATENTS

| | | |
|---|---|---|
| 1,500,496 | Hyde | July 8, 1924 |
| 1,632,427 | Allen | June 14, 1927 |
| 2,016,525 | Temple | Oct. 8, 1935 |
| 2,057,565 | Eksergian | Oct. 13, 1936 |
| 2,068,533 | Coffman | Jan. 19, 1937 |
| 2,484,532 | Sinclair | Oct. 11, 1949 |
| 2,774,504 | Moore | Dec. 18, 1956 |

FOREIGN PATENTS

| | | |
|---|---|---|
| 133,819 | Australia | Aug. 10, 1949 |
| 817,242 | Germany | Oct. 15, 1951 |
| 11,792 | Great Britain | of 1897 |
| 113,815 | Great Britain | Mar. 4, 1918 |
| 180,931 | Great Britain | June 8, 1922 |